US009152269B2

(12) United States Patent
Zhang et al.

(10) Patent No.: US 9,152,269 B2
(45) Date of Patent: Oct. 6, 2015

(54) SENSING CIRCUIT

(75) Inventors: Jun-Wei Zhang, Shenzhen (CN); Tsung-Jen Chuang, New Taipei (TW); Shih-Fang Wong, New Taipei (TW); Jun Zhang, Shenzhen (CN); Qi-Long Yu, Shenzhen (CN); Yang Xin, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 749 days.

(21) Appl. No.: 13/304,373

(22) Filed: Nov. 24, 2011

(65) Prior Publication Data
US 2013/0018601 A1    Jan. 17, 2013

(30) Foreign Application Priority Data
Jul. 14, 2011    (CN) .............................. 201110196983

(51) Int. Cl.
| | | |
|---|---|---|
| G01L 19/02 | (2006.01) | |
| G01L 19/12 | (2006.01) | |
| G01L 19/14 | (2006.01) | |
| G06F 3/00 | (2006.01) | |
| G06F 3/041 | (2006.01) | |
| G06F 3/042 | (2006.01) | |

(52) U.S. Cl.
CPC .............. *G06F 3/0416* (2013.01); *G06F 3/042* (2013.01)

(58) Field of Classification Search
CPC ........................................................ G06F 1/00
USPC .............. 702/41, 44, 55, 141, 150, 181, 188; 355/86; 700/180
See application file for complete search history.

(56) References Cited

U.S. PATENT DOCUMENTS

| | | | | | |
|---|---|---|---|---|---|
| 4,364,110 | A | * | 12/1982 | Hyatt ............................ | 700/180 |
| 5,168,456 | A | * | 12/1992 | Hyatt ............................ | 708/422 |
| 8,688,258 | B2 | * | 4/2014 | Miller .......................... | 700/180 |

* cited by examiner

*Primary Examiner* — Eliseo Ramos Feliciano
*Assistant Examiner* — Felix Suarez
(74) *Attorney, Agent, or Firm* — Novak Druce Connolly Bove + Quigg LLP

(57) ABSTRACT

A sensing circuit includes a plurality of sensors, a controller, a multiway switch, a linear optocoupler, and a logical control unit. The plurality of sensors are capable of measuring physical quantity, and each of the plurality of sensors is capable of generating a sensing signal in accordance with the physical quantity. The controller is capable of receiving and analyzing the sensing signals, and transforming the sensing signals into sensing events. The multiway switch is capable of selectively connecting one of the plurality of sensors to the controller. The linear optocoupler is connected between the plurality of sensors and the controller. The logical control unit is capable of controlling the multiway switch to selectively connect one of the plurality of sensors to the optocoupler, and generating a control signal to the controller, wherein the control signal indicating the one of the plurality of sensors connected to the controller.

8 Claims, 3 Drawing Sheets

SENSING CIRCUIT

BACKGROUND

1. Technical Field

The present disclosure relates to a sensing circuit, and particularly, to a sensing circuit for an electronic device.

2. Description of Related Art

Most electronic devices use sensing circuits to measure physical quantity around the electronic devices. Generally, a sensing circuit includes sensors, linear optocouplers, and controllers; sensing signals generated by the sensors are transferred with electrical isolation by the linear optocouplers to the controllers for analyzing. However, referring to FIG. 1, in a traditional sensing circuit, if eight sensors (S1-S8) are used, eight linear optocouplers (K1-K8) are required to be correspondingly connected with the eight sensors, and this increases cost.

BRIEF DESCRIPTION OF THE DRAWINGS

The components in the drawings are not necessarily drawn to scale, the emphasis instead being placed upon clearly illustrating the principles of a sensing circuit. Moreover, in the drawings, like reference numerals designate corresponding parts throughout the several views.

DETAILED DESCRIPTION

Figure 1:
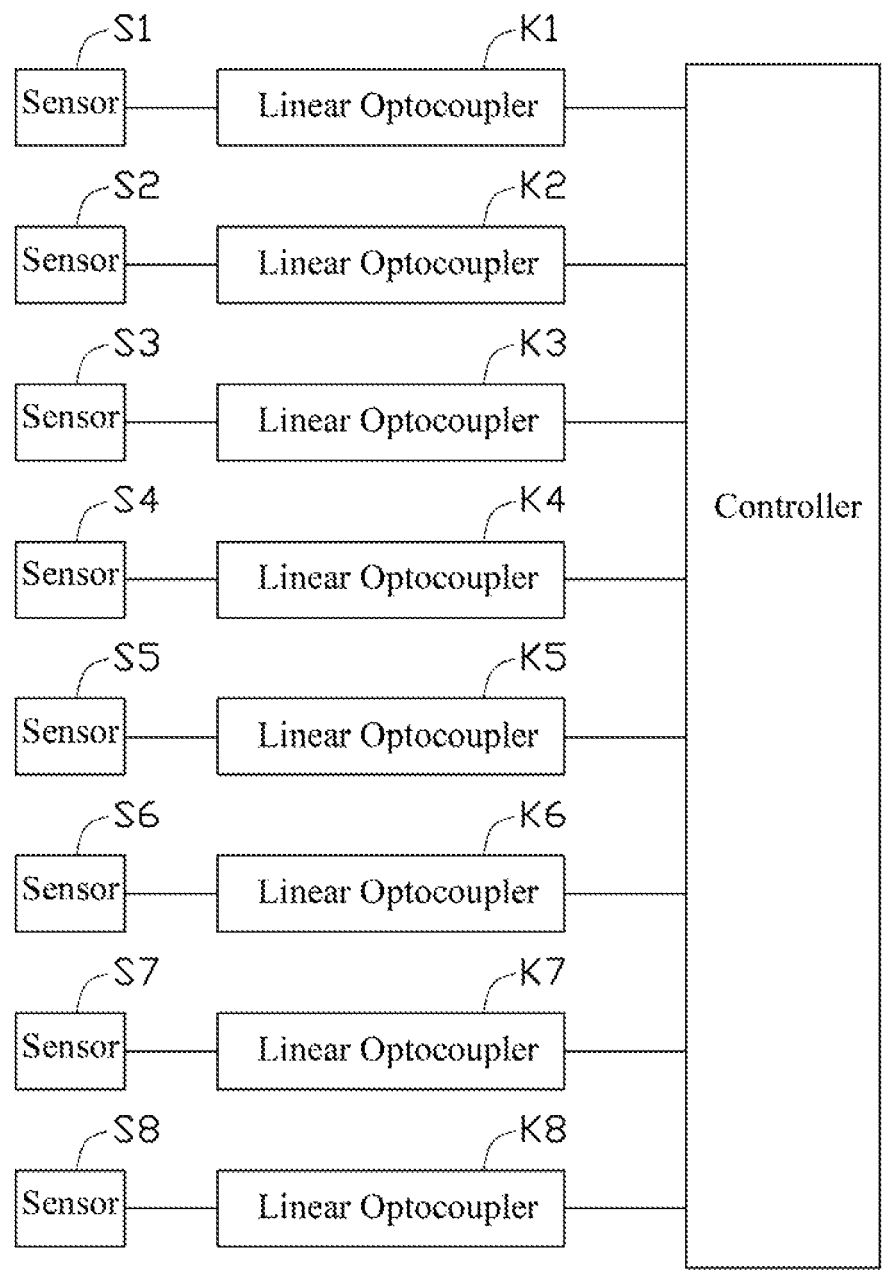
FIG. 1 is a block diagram of a sensing circuit in accordance with a prior art.
Figure 2:
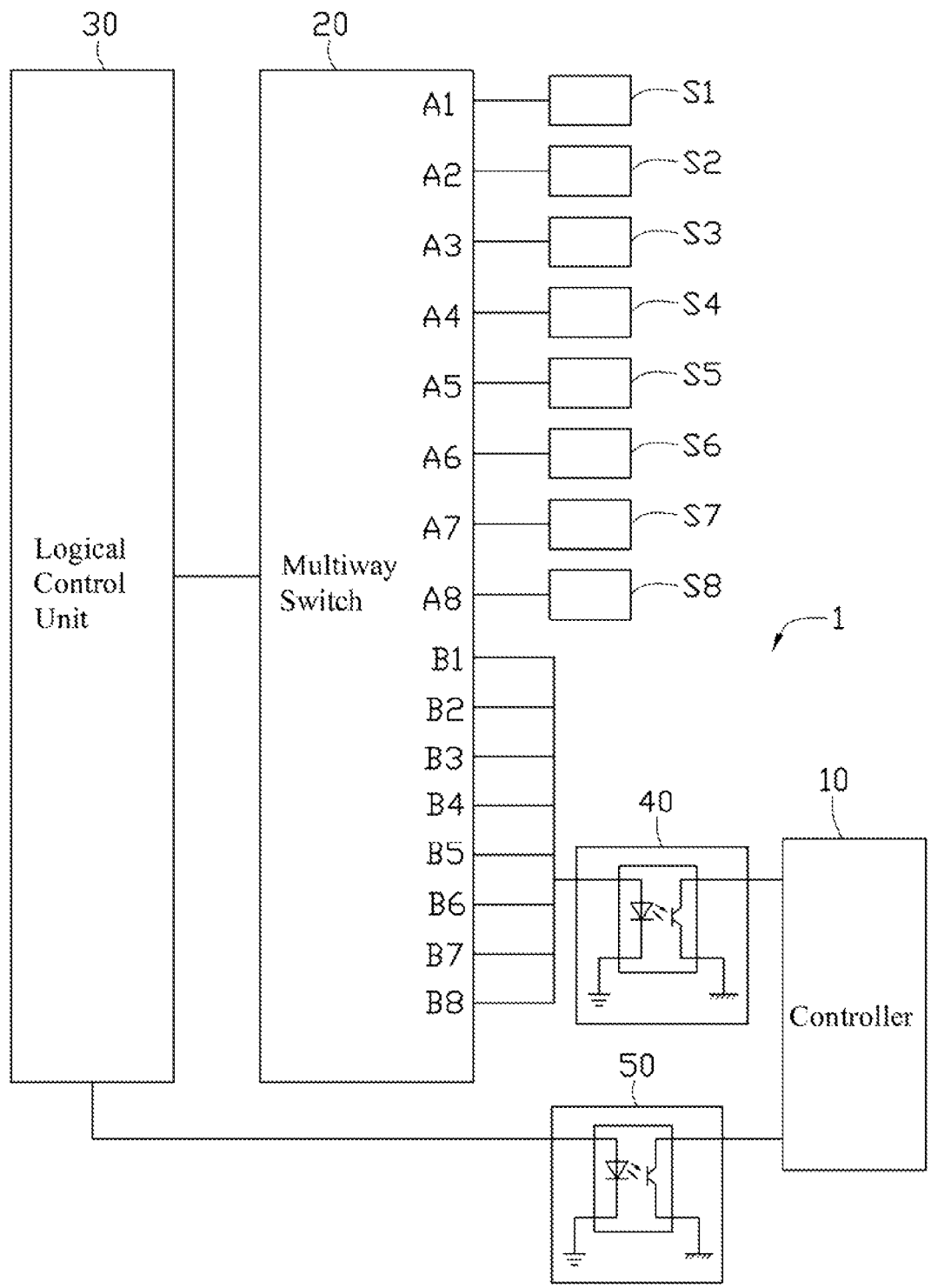
FIG. 2 is a block diagram of a sensing circuit in accordance with an exemplary embodiment.

Referring to FIG. 2, a sensing circuit 1 of an exemplary embodiment includes sensors S1-S8, a multiway switch 20, a logical control unit 30, a linear optocoupler 40, a digital optocoupler 50, and a controller 10.

The sensors are connected to the controller 10 sequentially through the multiway switch 20 and the linear optocoupler 40. The multiway switch 20 has input terminals A1-A8 respectively connected with the sensors S1-S8, and has output terminals B1-B8 connected with the linear optocoupler 40. The multiway switch 20 can selectively connect one of the input terminals A1-A8 to its corresponding output terminal B1-B8. For example, when the multiway switch 20 connects the input terminal A1 to the output terminal B1, a sensing signal generated by the sensor S1 can be transferred to the linear optocoupler 40, and is coupled with electrical isolation in the linear optocoupler 40 and transferred to the controller 10 for analysis.

The logical control unit 30 is connected with the multiway switch 20, and generates a switch signal to the multiway switch 20 to control the multiway switch 20 to connect one of the input terminals A1-A8 to its corresponding output terminals B1-B8. The logical control unit 30 is further connected with the controller 10 through the digital optocoupler 50. When the logical control unit 30 controls the multiway switch 20 to connect one of the sensors to the controller 10, it simultaneously generates a control signal to the controller 10 through the digital optocoupler 50. The control signal indicates which sensors are connected to the controller 10, and thus the controller 10 can determine which sensor is transferring the sensing signal. Therefore, the sensors can be alternately connected to the controller 10 for analyzing the sensing signals, and the sensing signals are then transformed into sensing events in the controller 10. In an exemplary embodiment, the sensors are touch sensors located on different positions of a touch screen (not shown), and when the touch sensors are transferring touch signals to the controller 10, the touch signals are analyzed and transformed into touch events in the controller 10.

Figure 3:
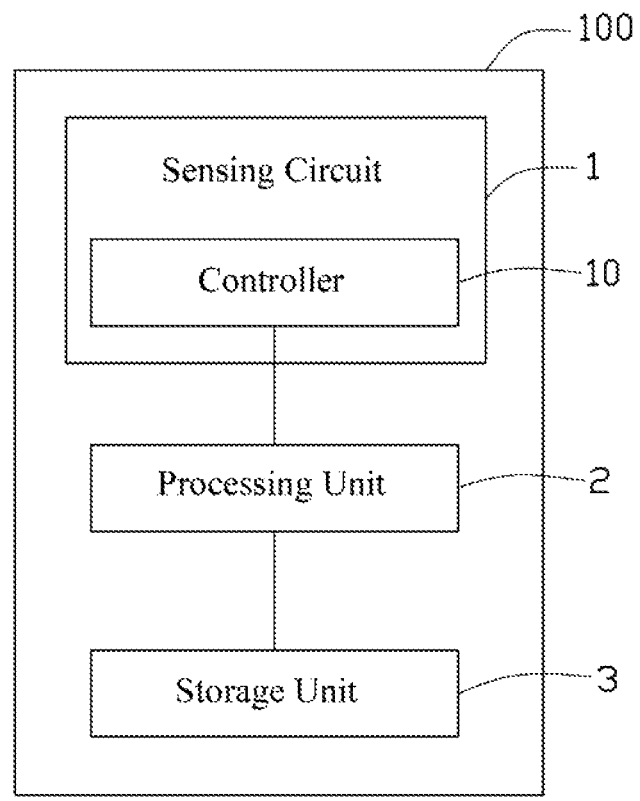
FIG. 3 is a schematic block diagram of an electronic device with the sensing circuit.

Referring to FIG. 3, an electronic device 100 includes the sensing circuit 1, a processing unit 2, and a storage unit 3. The processing unit 2 is connected between the sensing circuit 1 and the storage unit 3. The storage unit 3 stores a number of sensing events, pre-defined commands, and the correspondence of the sensing events to the pre-defined commands. The processing unit 2 receives the sensing events transferred from the controller 10, and determines which pre-defined command the sensing event corresponds to by acquiring the pre-defined commands corresponding to the sensing events in the storage unit 3. The processing unit 2 then executes the corresponding pre-defined command. In an exemplary embodiment, the sensors are touch sensors, the sensing events are touch events, and the pre-defined commands are selecting an object displayed on the touch screen.

Although the present disclosure has been specifically described on the basis of this exemplary embodiment, the disclosure is not to be construed as being limited thereto. Various changes or modifications may be made to the embodiment without departing from the scope and spirit of the disclosure.

What is claimed is:

1. A sensing circuit, comprising:
   a plurality of sensors capable of measuring physical quantity, and each of the plurality of sensors capable of generating a sensing signal in accordance with the physical quantity;
   a controller capable of receiving and analyzing the sensing signals, and transforming the sensing signals into sensing events;
   a multiway switch capable of selectively connecting one of the plurality of sensors to the controller;
   a linear optocoupler connected between the plurality of sensors and the controller, and configured to couple the sensing signals with electrical isolation and transfer the sensing signals to the controller for analysis; and
   a logical control unit capable of controlling the multiway switch to selectively connect one of the plurality of sensors to the optocoupler, and generating a control signal to the controller, the control signal indicating the one of the plurality of sensors connected to the controller.

2. The sensing circuit as claimed in claim 1, further comprising a digital optocoupler connected between the logical control unit and the controller to transfer the control signal.

3. The sensing circuit as claimed in claim 1, wherein the multiway switch comprises a plurality of input terminals and a plurality of output terminals; each of the plurality of input terminals is connected to one of the plurality of sensors; each of the plurality of output terminals are connected to the controller; the multiway switch is capable of selectively connecting one of the plurality of input terminals to one of the plurality of output terminals corresponding to the one of the plurality of input terminals.

4. The sensing circuit as claimed in claim 1, wherein the plurality of sensors are touch sensors.

5. An electronic device, comprising:
   a sensing circuit capable of generating a plurality of sensing events;
   a storage unit storing the plurality of sensing events, a plurality of pre-defined commands, and a relationship between each of the plurality of sensing events and each of the plurality of pre-defined commands; and a processing unit connected between the sensing circuit and the storage unit, and capable of relating the plurality of sensing events to the plurality of pre-defined commands according to the relationship stored in the storage unit, wherein the sensing circuit further comprises a plurality of sensors capable of measuring physical quantity, and each of the plurality of sensors is capable of generating a sensing signal in accordance with the physical quantity; a controller capable of receiving and analyzing the sensing signals, and transforming the sensing signals into sensing events; a multiway switch capable of selectively connecting one of the plurality of sensors to the controller; a linear optocoupler connected between the plurality of sensors and the controller and configured to couple the sensing signals with electrical isolation and transfer the sensing signals to the controller for analysis; and a logical control unit capable of controlling the multiway switch to selectively connect one of the plurality of sensors to the optocoupler, and generating a control signal to the controller, the control signal indicating the one of the plurality of sensors connected to the controller.

6. The electronic device as claimed in claim 5, wherein the sensing circuit further comprises a digital optocoupler connected between the logical control unit and the controller to transfer the control signal.

7. The electronic device as claimed in claim 5, wherein the multiway switch comprises a plurality of input terminals and a plurality of output terminals; each of the plurality of input terminals is connected to one of the plurality of sensors; each of the plurality of output terminals are connected to the controller; the multiway switch is capable of selectively connecting one of the plurality of input terminals to one of the plurality of output terminals corresponding to the one of the plurality of input terminals.

8. The electronic device as claimed in claim 5, wherein the plurality of sensors are touch sensors.

* * * * *